(12) United States Patent
Vande Berg

(10) Patent No.: US 7,159,772 B2
(45) Date of Patent: Jan. 9, 2007

(54) APPARATUS AND METHOD FOR MOUNTING AN RF TAG ON A CONVEYOR TROLLEY

(75) Inventor: David M. Vande Berg, Sioux Center, IA (US)

(73) Assignee: VBS, Inc., Sioux Center, IA (US)

( * ) Notice: Subject to any disclaimer, the term of this patent is extended or adjusted under 35 U.S.C. 154(b) by 841 days.

(21) Appl. No.: 09/911,993

(22) Filed: Jul. 24, 2001

(65) Prior Publication Data

US 2003/0019928 A1 Jan. 30, 2003

(51) Int. Cl.
*G06F 19/00* (2006.01)
*G06Q 30/00* (2006.01)
*G06Q 90/00* (2006.01)

(52) U.S. Cl. .................................... 235/385
(58) Field of Classification Search ............... 235/385, 235/383, 384; 198/347.1, 347.2, 347.3, 347.4, 198/348, 349, 349.1, 349.2, 349.3, 349.4, 198/349.5, 349.6, 349.7, 349.8, 349.9; 705/22, 705/28; 474/166, 168, 174, 184, 195
See application file for complete search history.

(56) References Cited

U.S. PATENT DOCUMENTS

| | | | | |
|---|---|---|---|---|
| 3,263,789 A | * | 8/1966 | Schacht | 400/131 |
| 3,589,503 A | * | 6/1971 | Leach | 198/683 |
| 3,651,704 A | * | 3/1972 | Chapman et al. | 116/200 |
| 3,707,925 A | * | 1/1973 | Brynes, Sr. | 104/167 |
| 3,708,847 A | * | 1/1973 | Mitchell | 29/894.31 |
| 3,843,188 A | * | 10/1974 | Kirschner | 295/7 |
| 3,876,182 A | * | 4/1975 | Hansson | 254/360 |
| 3,957,150 A | * | 5/1976 | Cappotto | 400/375.2 |
| 4,392,392 A | * | 7/1983 | Perisic et al. | 475/4 |
| 4,490,128 A | * | 12/1984 | Weiss et al. | 474/166 |
| 4,548,592 A | * | 10/1985 | Ohhashi et al. | 474/168 |
| 4,597,495 A | * | 7/1986 | Knosby | 209/3.3 |
| 4,600,400 A | * | 7/1986 | Hallerback | 474/166 |
| 4,697,278 A | * | 9/1987 | Fleischer | 235/95 B |
| 4,708,066 A | * | 11/1987 | Heckman | 105/215.2 |
| 4,717,370 A | * | 1/1988 | Rohrig | 474/161 |
| 4,969,548 A | * | 11/1990 | Kornylak | 193/35 R |
| 5,072,822 A | * | 12/1991 | Smith | 198/349 |
| 5,156,533 A | * | 10/1992 | Hoffman et al. | 105/148 |
| 5,176,331 A | * | 1/1993 | Horne | 242/390 |
| 5,301,809 A | | 4/1994 | Skinner | 209/3.1 |
| 5,368,370 A | * | 11/1994 | Beam | 301/37.36 |
| 5,498,202 A | | 3/1996 | Vande Berg | 452/184 |
| 5,577,593 A | | 11/1996 | Hooper | 198/346.1 |
| 5,673,018 A | * | 9/1997 | Lowe et al. | 340/445 |

(Continued)

FOREIGN PATENT DOCUMENTS

DE 3514235 A * 10/1986

(Continued)

OTHER PUBLICATIONS

Sales literature of Nedap NV of The Netherlands, for a meathook identification apparatus, exact publication date unknown, but at least one year prior to the filing of the present application.

(Continued)

*Primary Examiner*—Uyen-Chau N. Le
(74) *Attorney, Agent, or Firm*—Lathrop & Gage LC

(57) ABSTRACT

A system for mounting an RF tag to a conveyor trolley wherein the tag is embedded in a block of material shaped to fit within an annular recess formed between the hub and outer rim of the trolley wheel. The shaped block is secured to the wheel.

9 Claims, 1 Drawing Sheet

U.S. PATENT DOCUMENTS

| | | | |
|---|---|---|---|
| 5,687,850 A | 11/1997 | Speckhart et al. | 209/2 |
| 5,692,700 A * | 12/1997 | Bobeczko | 242/588.2 |
| 5,707,262 A * | 1/1998 | Huntley et al. | 440/53 |
| 5,758,847 A | 6/1998 | Corell et al. | 246/25 |
| 5,799,769 A | 9/1998 | Heer et al. | 198/349 |
| 5,867,093 A * | 2/1999 | Dodd et al. | 340/461 |
| 5,929,760 A | 7/1999 | Monahan | 340/572.7 |
| 5,964,656 A | 10/1999 | Lawler, Jr. et al. | 452/173 |
| 5,974,708 A * | 11/1999 | Webb et al. | 40/316 |
| 5,980,377 A | 11/1999 | Zwanikken et al. | 452/184 |
| 6,016,745 A * | 1/2000 | Bartel et al. | 101/18 |
| 6,017,269 A | 1/2000 | Altenpohl, III | 452/188 |
| 6,047,814 A | 4/2000 | Alles et al. | 198/810.02 |
| 6,085,368 A * | 7/2000 | Robert et al. | 5/85.1 |
| 6,104,966 A | 8/2000 | Haagensen | 700/116 |
| 6,131,744 A * | 10/2000 | Pratt | 209/540 |
| 6,148,249 A | 11/2000 | Newman | 700/225 |
| 6,196,912 B1 | 3/2001 | Lawler, Jr. et al. | 452/173 |
| 6,231,435 B1 | 5/2001 | Pilger | 452/157 |
| 6,267,291 B1 * | 7/2001 | Blankenship et al. | 235/375 |
| 6,452,497 B1 * | 9/2002 | Finlayson | 340/572.8 |
| 6,494,305 B1 * | 12/2002 | Black et al. | 198/349 |
| 6,547,128 B1 * | 4/2003 | Shimura | 235/95 B |
| 6,561,490 B1 * | 5/2003 | Kiviniitty | 254/411 |
| 6,568,593 B1 * | 5/2003 | Hetzer | 235/385 |
| 6,724,309 B1 * | 4/2004 | Grose et al. | 340/572.1 |

FOREIGN PATENT DOCUMENTS

| | | | |
|---|---|---|---|
| EP | 834841 A2 * | 4/1998 | |
| JP | 54070545 A * | 6/1979 | |
| WO | WO 9836645 A1 * | 8/1998 | |

OTHER PUBLICATIONS

Sales literature of SFK Meat Systems a.m.b.a. of Denmark, for an automatic identification for trolleys, exact publication date unknown, but at least one year prior to the filing of the present application.

* cited by examiner

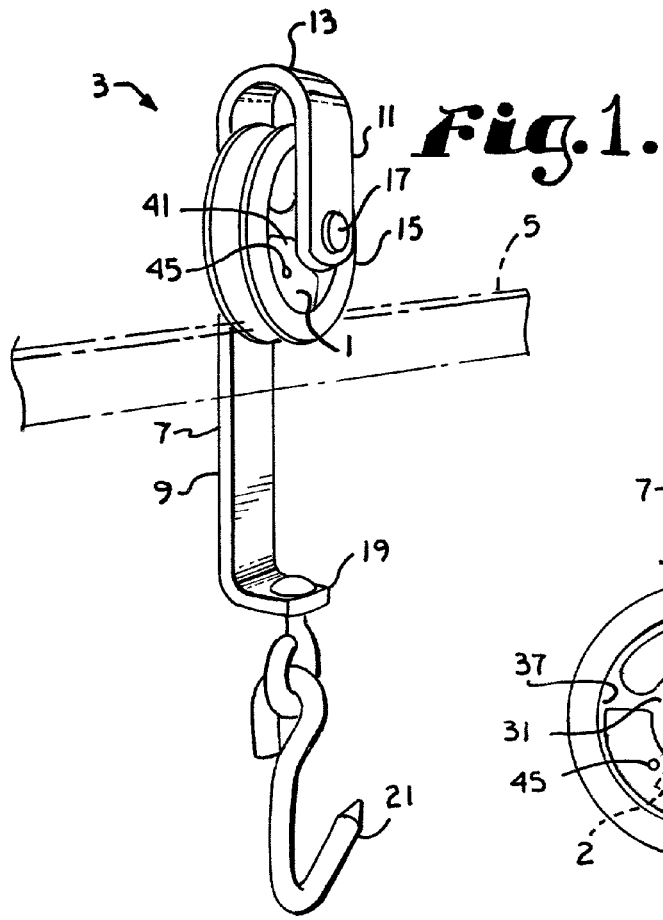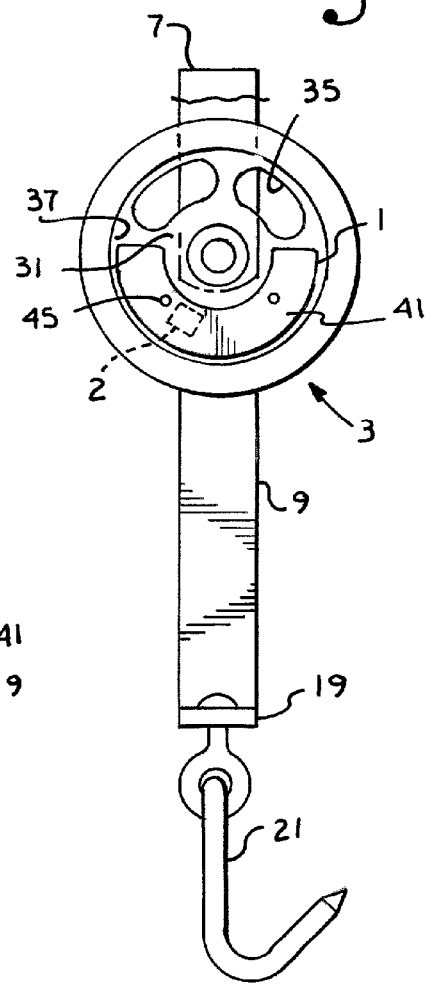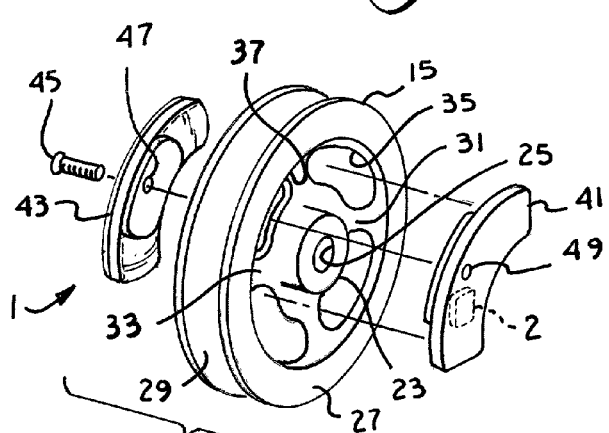

APPARATUS AND METHOD FOR MOUNTING AN RF TAG ON A CONVEYOR TROLLEY

BACKGROUND OF THE INVENTION

1. Field of the Invention

The invention relates to an apparatus and method for mounting an RF tag on the wheel of a conveyor trolley, the tag emitting a signal used to identify the trolley and/or a load supported therefrom.

2. Description of the Related Art

It is common practice in many production facilities to move items such as products being processed or assembled, or components thereof, along a conveyor line. It is often required that there be a way to identify individual items as they move along the production line so that their progress can be tracked and vital information about each item can be recorded. For example, in the meat processing industry, individual animal carcasses must be identified as they move through the processing plant so that weight and grade information recorded as the carcass is processed will be associated with the correct animal. The identification needs to be accurate because the information recorded will be used to determine the price that the feed lot or producer will be paid for the animal. In addition, carcass evaluation statistics such as carcass weight, fat percentage, marbling, and rib-eye area for each animal slaughtered may be transmitted back to the producer and used to select animals for breeding which are most likely to produce offspring with desirable carcass characteristics.

Many methods have been used to identify individual animal carcasses as they move along a conveyor line. Identifying indicia may be connected directly to the animal carcass. For example, U.S. Pat. No. 6,148,249 to Newman discloses using a matrix of machine readable marking applied to the carcass or to primal cuts thereof to identify the carcass. Alternatively, the source of identification may be associated with a conveyor trolley from which the carcass is suspended. Such trolleys generally comprise a trolley wheel rotatably mounted to a strap which extends downwardly from the wheel and supports a hook from which the carcass is suspended.

U.S. Pat. No. 5,498,202 to the present inventor discloses using a machine readable pattern of holes in the trolley strap for identification purposes. It is also known to attach a small radio frequency transponder or "RF tag" to the trolley strap. The RF tag emits a radio signal consisting of a number which can be used to identify the trolley and the carcass suspended therefrom. U.S. Pat. No. 6,196,912 to Lawler Jr. et al. discloses the use of an encapsulated RF tag bolted to the trolley strap. In addition, certain systems manufactured by SFK Meat Systems of Kolding, Denmark utilize an RF tag which is molded into a housing welded to the trolley strap.

Several problems exist with the known methods of mounting an RF tag on a conveyor trolley; one of which is that a tag mounted on the trolley strap is in an exposed position where physical damage can occur to the tag. A second problem is that installation of an RF tag on an existing trolley by any of the known methods requires that the trolley be modified by welding or machining to accept the tag. In the case of tags which are welded to the trolley, the tags are difficult to remove for replacement or repair should the tag malfunction.

What is needed is an apparatus and method for mounting an RF tag on a conveyor trolley which places the tag in a protected position, which can be used on an existing trolley without need for modifying the trolley, and which allows the tag to be easily removed and replaced.

SUMMARY OF THE INVENTION

The present invention comprises a system for attaching an RF tag to a conveyor trolley having a wheel with a hub, an outer rim, and a web connecting the outer rim to the hub, the web being narrower than the rim such that first and second annular recesses are formed between the hub and the outer rim on respective sides of the web. The RF tag is embedded in a block of plastic material, such as epoxy, which is shaped to fit within the first annular recess of the trolley wheel and secured to the wheel. The web may comprise a plurality of spokes having openings formed therebetween, in which case the block is secured to the wheel by a clamping member which is positioned in the second annular recess and fastened to the block by one or more fasteners, the fasteners extending through the openings between the spokes. The block and/or clamping member may be shaped to extend into one or more of the openings in order to positively position the block relative to the wheel.

BRIEF DESCRIPTION OF THE DRAWINGS

FIG. 1 is a perspective view of a conveyor trolley having an RF tag attached according to the present invention, the tag being embedded in a shaped block extending one quarter of the way around the trolley wheel.

FIG. 2 is a side view of a conveyor trolley having an RF tag attached according to the present invention, the tag being embedded in a shaped block extending halfway around the trolley wheel, with a portion of the strap being cut away for purposes of clarity.

FIG. 3 is an exploded perspective view of the trolley wheel of FIG. 1 showing the tag mounting apparatus.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference number 1 generally designates a mounting system for mounting an RF tag 2 to a conveyor trolley 3. The tag 2 may be of either the passive or active type, and transmits a radio signal to identify the trolley 3 and/or a load suspended therefrom. The trolley 3 shown in FIGS. 1 and 2 is an exemplary trolley of a type used for supporting an animal carcass for movement along a track 5 through a meat processing facility. The trolley 3 comprises a strap 7 having a first leg 9 and a second leg 11 connected by an arch 13. A trolley wheel 15 is rotatably mounted between the first leg 9 and second leg 11 on an axle 17. The first leg 9 of the strap 7 extends downwardly past the bottom of the wheel 15 to a foot 19 which supports a hook 21 from which the carcass is suspended. The second leg 11 is shorter than the first leg 9 and terminates proximate the mounting point for the axle 17.

As best seen in FIG. 3, the wheel 15 includes a hub 23 with an axle receiver 25 for receiving the axle 17. The wheel 15 also includes an outer rim 27 having a groove 29 for engaging the track 5. The hub 23 is connected to the outer rim 27 by a web 31 which may comprise a plurality of spokes 33 (four shown), which are separated by openings 35. The web 31 is thinner or narrower than the hub 23 and outer rim 27 of the wheel 15, resulting in an annular depression or recess 37 being formed on each side of the web 31 between the hub 23 and rim 27.

The mounting system 1 involves embedding the RF tag 2 into a block 41 of moldable or castable material such as an epoxy, polymer, or other plastic material, and attaching the block 41 to the wheel 15 of the trolley 3. The block 41 is shaped to fit into one of the annular cavities 37 of the wheel 15, and may extend partly into one or more of the openings 35 between the spokes 33 in order to positively retain the block 41 in position relative to the wheel 15. The block 41 containing the tag 2 is preferably mounted on the side of the wheel 15 adjacent the second or short leg 11 of the strap 7, since this side is less obstructed by the strap 7 and thereby allows for greater RF tag charge and read time than the side adjacent the first or long leg 9.

Two embodiments of the block 41 are shown in the figures: FIGS. 1 and 3 show a block 41 which covers one quarter of the annular recess 37 and extends into one of the openings 35; FIG. 2 shows a block 41 which covers half of the annular recess 37 and extends into two of the openings 35. Either of the embodiments depicted will allow the block 41 to be easily installed on an existing trolley 3, since the block 41 can be maneuvered around the strap 7 and into the annular recess 37. It would also be possible to practice the present invention by using an annular block 41 (not shown) which would completely encircle the hub 23, however such a block 41 would have to be installed on the wheel 15 prior to assembly of the trolley 3. An annular block 41 would have the advantage of keeping the wheel 15 from being unbalanced by the weight of the block 41.

The block 41 is held in place on the wheel 15 by a clamping member 43 which is fastened to the block 41 so as to clamp a portion of the wheel 15 therebetween. The clamping member 43 is preferably a shaped block of plastic material similar to the block 41 but without an imbedded RF tag. The clamping member 43 is positioned on the opposite side of the web 31 from the block 41 in the second annular recess 37. The clamping member 43 is preferably connected to the block 41 by one or more threaded fasteners 45, such as screws or bolts. If threaded fasteners 45 are used, one or more holes 47 are provided in the clamping member 43 to receive the threaded fasteners 45. The fasteners 45 each extend through one of the openings 35 and engage a threaded receiver 49 in the block 41. As the fasteners 45 are tightened down, the clamping member 43 and block 41 are drawn against the web 31, thereby holding the block 41 in position. Alternatively, the clamping member 43 could be connected to the block 41 by rivets, adhesive, or other fastening means such as interlocking studs, however these fasteners are not easily removable and would make the tag 2 more difficult to replace. When the tag 2 is mounted as described, the tag 2 is protected from physical damage by the block 41, by the trolley wheel 15 and by the second leg 11 of the strap 7.

It is to be understood that while certain forms of the present invention have been illustrated and described herein, it is not to be limited to the specific forms or arrangement of parts described and shown. For example, while the mounting system 1 has been described for use in conjunction with a particular design of trolley 3, the description of the trolley 3 is for purposes of example only, and the mounting system 1 can be used on virtually any conveyor trolley having one or more wheels to which the block 41 can be mounted. While the majority of such wheels inherently include an annular recess between an outer rim and hub thereof which provides a convenient mounting place for the block 41, it is not essential that the wheel have such a recess. If the wheels are of a type lacking annular recesses, a recess in the form of a hole or cavity could be bored into the wheel and an appropriately shaped block 41 mounted therein. It is also to be understood that the particular design of the clamping member 43 is not critical, and that the clamping member 43 need not be a shaped plastic block as described, and could take a variety of forms, including a metal bracket or strap. Further, while the block 41 containing the tag 2 has been described herein as having an annular or partially annular shape to closely conform to one of the annular recesses 37, it is foreseen that the block 41 could be formed in a wide variety of shapes including, but not limited to, circular, rectangular, triangular, or ovate shapes, so long as the block 41 will fit within the respective recess 37.

What is claimed and desired to be secured by Letters Patent is as follows:

1. A conveyor trolley comprising:
    a) a strap having first and second legs connected by an arch;
    b) a wheel having a hub, an outer rim, and a web connecting said outer rim to said hub, said web having a thickness which is less than the thickness of said outer rim such that an a first annular recess is formed between said hub and said outer rim; said wheel being rotatably mounted on an axle between said first and second legs of said strap;
    c) a hook extending downward from said first leg for suspending a load therefrom; and
    d) an RF tag mounted in said first annular recess for transmitting an identifying signal.

2. The conveyor trolley as in claim 1, wherein said RF tag is imbedded in a first block of material shaped to conform to a portion of said first annular recess.

3. The conveyor trolley as in claim 2 wherein said web comprises a plurality of spokes separated by openings, and said first block is shaped to extend into one of said openings between said spokes.

4. The conveyor trolley as in claim 1 wherein said first annular recess is adjacent said second leg and said second leg terminates proximate said axle.

5. A conveyor trolley comprising:
    a strap having first and second legs connected by an arch;
    a wheel having a hub, an outer rim, and a web connecting said outer rim to said hub, said web having a thickness which is less than the thickness of said outer rim such that a first annular recess is formed between said hub and said outer rim, a second annular recess on the opposite side of said web from said first annular recess, said web comprising a plurality of spokes separated by openings, said wheel being rotatably mounted on an axle between said first and second legs of said strap;

a hook extending downward from said first leg for suspending a load therefrom; and an RF tag mounted in said first annular recess of said wheel for transmitting an identifying signal, said RF tag being imbedded in a first block of material shaped to conform to a portion of said first annular recess, said first block being shaped to extend into one of said openings between said spokes, said first block being mounted in said first recess by a clamping member seated in said second recess and secured to said first block by a fastener such that said first block and said clamping member abut opposite sides of at least one of said spokes.

6. The conveyor trolley as in claim 5 wherein said clamping member is a second block of material shaped to conform to a portion of said second annular recess.

7. The conveyor trolley as in claim 6 wherein said second block is shaped to extend into said one opening.

8. The conveyor trolley as in claim 5 wherein said fastener includes one or more rivet.

9. A method of attaching an RF tag to a conveyor trolley having a wheel with a hub, an outer rim, and a web connecting the hub to the outer rim, the web comprising a plurality of spokes with openings formed therebetween, the web having a thickness which is less than the thickness of the outer rim such that first and second annular recesses are formed between the hub and the outer rim on respective sides of the web, said method comprising the steps of:

a) securing said RF tag to a block of material shaped to fit into one of said annular recesses;

b) placing said block in the first annular recess;

c) placing a clamping member in the second recess opposite said block;

d) connecting said clamping member to said block with a threaded fastener extending through one of the openings in the web;

e) tightening said threaded fastener to draw said block and said clamping member together and against said spokes.

* * * * *